United States Patent Office 2,751,380
Patented June 19, 1956

---

2,751,380

STEROID COMPOUNDS

George Slomp, Jr., Kalamazoo Township, Kalamazoo County, Mich., assignor to The Upjohn Company, Kalamazoo, Mich., a corporation of Michigan No Drawing. Application January 4, 1954, Serial No. 402,127

7 Claims. (Cl. 260—239.55)

The present invention relates to steroid diepoxy-enol-acylates of the pregnane series, and is more particularly concerned with novel 3,20-diacyloxy-5(6),16(17)-diepoxy-20-pregnene compounds and a novel process for the production thereof.

The novel compounds of the present invention may be represented by the formula:

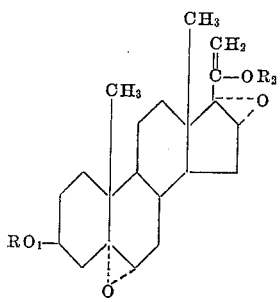

wherein $R_1$ and $R_2$ are acyl radicals of hydrocarbon carboxylic acids containing up to and including eight carbon atoms.

The process of the present invention consists of treating a 3,20-diacyloxy-5,16,20-pregnatriene with an organic peracid, to obtain selective epoxidation of the 5(6) and the 16(17) double bonds.

It is an object of the present invention to provide 3,20-diacyloxy - 5(6),16(17) - diepoxy - 20 - pregnenes. Another object of the present invention is the selective epoxidation of a 3,20-diacyloxy-5,16,20-pregnatriene to yield 3,20 - diacyloxy -5(6),16(17) - diepoxy - 20 - pregnene compounds. Other objects of the present invention will be apparent to those skilled in the art to which this invention pertains.

The diepoxides of this invention are valuable intermediates in the preparation of physiologically active steroid compounds. For example, Reichstein's Compound S acetate and Kendall's Compound F may be obtained from the 3,20-diacyloxy-5(6),16(17)-diepoxy-20-pregnenes by the following steps: hydrolysis to give 3β-hydroxy - 5(6),16(17) - diepoxypregnan - 20 - one, bromination to give 3β-hydroxy-5(6),16(17)-diepoxy-21-bromopregnan-20-one, treatment with potassium iodide in acetone and treatment of the thus formed 21-iodide with potassium acetate to yield 3β-hydroxy-5(6),16(17)-diepoxy-21-acetoxypregnan-20-one, treatment with hydrogen bromide followed by Raney nickel reduction to give 3β,5α,17α-trihydroxy-21-acetoxypregnan-20-one and oxidation with chromic acid to give 5α,17α-dihydroxy-21-acetoxypregnane-3,20-dione which when boiled with alcoholic potassium carbonate yields 17α-hydroxy-21-acetoxy-4-pregnene-3,20-dione (Compound S acetate). Treatment of Reichstein's Compound S acetate with *Streptomyces fradiae* [cf. Colingsworth et al., J. Am. Chem. Soc. 74, 2381 (1952)] yields Kendall's Compound F (11β,17α,21-trihydroxy-4-pregnene-3,20-dione).

The starting compounds of the present invention are the 3β,20-diacyloxy-5,16,20-pregnatrienes. These compounds are made from the known 3β-hydroxy-5,16-pregnadien-20-one (16-dehydropregnenolone) or from the 3-esters thereof by esterification and enol esterification. If it is desired to have identical acyloxy groups in the 3- and 20-positions, the esterification and enol esterification may be performed in one step, for example, by heating at reflux or slowly distilling a mixture of 16-dehydropregnenolone with an acid anhydride such as acetic, propionic, butyric, valeric anhydride and the like, or with an isopropenyl ester, such as isopropenyl acetate, propionate, butyrate, valerate, isovalerate, hexanoate, heptanoate, octanoate, benzoate, β-cyclopentylpropionate, phenylacetate, toluate, salicylate, and the like, in the presence of an acid catalyst, preferable paratoluenesulfonic acid monohydrate, and isolating the thus-prepared 3β,20-diacyloxy-5,16,20-pregnatriene as shown in Preparations 1 and 2. Another method of preparing 3β,20-diacyloxy-5,16,20-pregnatriene consists in enol acylation of 16-dehydropregnenolone esters as illustrated by the method of Moffett et al., J. Am. Chem. Soc. 74, 2183 (1952), for the preparation of 3β,20-diacetoxy-5,16,20-pregnatriene. By using a specific 16-dehydropregnenolone ester, prepared by standard methods of esterification, and subsequent enol acylation, 3β,20-diacyloxy-5,16,20-pregnatrienes with unlike acyloxy groups can be prepared (cf. Preparations 3 through 6). The esters of 16-dehydropregnenolone are obtained by admixing 16-dehydropregnenolone with an acylating agent such as, for example, ketene, an acid, an acid chloride or bromide or an acid anhydride or other known acylating agents usually in a solvent such as, for example, pyridine, or the like, or an inert solvent, including solvents like benzene, toluene, ether and the like, and heating at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants can be varied. The ester is recovered from the reaction mixture by pouring into ice or cold water, collecting in an appropriate solvent, and washing with successive portions of a mildly basic solution and water to obtain a solution of the product which is essentially neutral. In some instances, the ester crystallizes from the reaction mixture, in which case it is advantageously separated by filtration or other means, washed with water, and thereafter purified by conventional means, such as by recrystallization from a suitable solvent or by chromatographic purification, as deemed necessary.

In carrying out the process of the present invention the selected 3β,20-diacyloxy-5,16,20-pregnatriene, either as a solid or dissolved in an organic solvent is admixed with the solution of an epoxidizing agent in an organic solvent. Suitable solvents for either the starting compound or the epoxidizing agents are benzene, chloroform, toluene, chlorobenzene, carbon tetrachloride, methylene dichloride, hexane mixtures like Skellysolve B, and the like, with benzene and chloroform preferred. The epoxidizing agents utilized are usually perbenzoic acid, peracetic acid, performic acid, monoperphthalic acid and other available organic peracids. The preferred temperature range for the epoxidation reaction is between zero and thirty degrees centigrade, but a temperature range of minus ten and plus forty degrees centigrade are operative. The time of reaction may vary between a quarter of an hour and twenty-four hours or even longer. The course of reaction and the relative completeness of the reaction, can be followed by iodometric titration of aliquot samples withdrawn from the mixture at regular time intervals. After two moles of peracids are consumed, the reaction can be quenched by adding water or crushed ice. The product, a 3β,20-diacyloxy - 5α(6α),16α(17α) - diepoxy - 20 - pregnene is obtained from the organic layer by standard procedures, such as solvent extraction, evaporating the organic solvent and recrystallization from organic solvents such as methanol, ethanol, ethyl acetate and Skellysolve B hexanes, mixtures of these, and the like.

The following examples are illustrative of the process and products of the present invention, but are not to be construed as limiting.

PREPARATION 1.—3β,20-DIACETOXY-5,16,20-PREGNATRIENE

One gram of 3β, - hydroxy - 5,16 - pregnadien - 20-one (16-dehydropregnenolone), 100 milligrams of para-toluenesulfonic acid monohydrate, five milliliters of acetic anhydride and five milliliters of benzene were heated under reflux at atmospheric pressure for a period of eight hours. The excess of acetic anhydride, the acetic acid, and the benzene were then removed by distillation under reduced pressure and the reaction mixture was taken up in 100 milliliters of ether. The ether solution was washed three times with twenty milliliter portions of five percent sodium carbonate solution and subsequently with water until neutral. The ether was then removed under reduced pressure and the residue was recrystallized from acetone to give 3β,20-diacetoxy-5,16,20-pregnatriene of melting point 148 to 149 degrees centigrade.

PREPARATION 2.—3β,20-DIPROPIONYLOXY-5,16,20-PREGNATRIENE

A solution of one gram of 3β-hydroxy-5,16-pregnadien-20-one in twenty-five milliliters of isopropenyl propionate and 150 milligrams of para-toluenesulfonic acid monohydrate were slowly distilled for a period of twelve hours. From time to time isopropenyl propionate was added to keep the volume of the solution above ten milliliters. After the mixture had cooled, one gram of sodium bicarbonate was added and the remaining isopropenyl propionate was removed by distillation under reduced pressure. The residue was shaken with ether and ice water, the water layer was extracted with more ether and the combined ether layer was washed with saturated sodium chloride solution, water, and dried over anhydrous sodium sulfate. The ether was removed under reduced pressure and the residue was recrystallized from acetone to yield pure 3β,20-dipropionyloxy-5,16,20-pregnatriene.

In a similar manner by treating 16-dehydropregnenolone with other hydrocarbon carboxylic acid anhydrides or with a selected isopropenyl ester, the following representative esters may be made: 3β,20-dibutyryloxy-5,16,20 - pregnatriene, 3β,20 - divaleryloxy - 5,16,20-pregnatriene, 3β,20 - di - isovaleryloxy - 5,16,20 - pregnatriene, 3β,20-dihexanoyloxy-5,16,20-pregnatriene, 3β,20-diheptanoyloxy - 5,16,20 - pregnatriene, 3β,20 - dioctanoyloxy-5,16,20 - pregnatriene, 3β,20 - dibenzoyloxy - 5,16,20-pregnatriene, 3β,20 - (β - cyclopentylpropionyloxy)-5,16,20 - pregnatriene, 3β,20 - phenylacetoxy - 5,16,20-pregnatriene, 3β,20 - toluyloxy - 5,16,20 - pregnatriene, 3β,20 - anisoyloxy - 5,16,20 - pregnatriene, 3β,20 - salicyloyloxy - 5,16,20 - pregnatriene, 3β,20 - galiyloxy-5,16,20 - pregnatriene, 3β,20 - maleyloxy - 5,16,20 - pregnatriene, 3β,20 - hemisuccinyloxy - 5,16,20 - pregnatriene, 3β,20 - dihydrogencitryloxy - 5,16,20 - pregnatriene, and the like.

PREPARATION 3.—3β-BENZOYLOXY-5,16-PREGNADIEN-20-ONE

One gram of 3β-hydroxy-5,16-pregnadiene-20-one dissolved in ten milliliters of pyridine was allowed to stand with one milliliter of benzoyl chloride at room temperature (about 22 to 25 degrees centigrade) for a period of two hours. Thereafter the mixture was poured into thirty milliliters of water. The precipitate thus formed was allowed to settle, the supernatant liquid was decanted and the residue was washed with five percent sodium carbonate solutions and water and recrystallized from methyl alcohol to yield 3β-benzoyloxy-5,16-pregnadien-20-one.

PREPARATION 4.—3β-BENZOYLOXY-20-ACETOXY-5,16,20-PREGNATRIENE

A solution of 1.0 gram of 3β-benzoyloxy-5,16,-pregnadien-20-one (Preparation 2) and 0.15 gram of para-toluenesulfonic acid monohydrate in twenty milliliters of isopropenyl acetate was slowly distilled for a period of ten hours through a short fractionating column. From time to time isopropenyl acetate was added to keep the volume of the solution above ten milliliters. After cooling the solution remaining in the flask, one gram of sodium bicarbonate was added and the remaining isopropenyl acetate was removed by distillation under reduced pressure at less than thirty degrees centigrade. The residue was shaken with ether and ice water, the water layer was extracted with more ether and the combined ether layer was washed with saturated sodium chloride solution, water, and dried over anhydrous sodium sulfate. The ether was removed under reduced pressure and the residue was recrystallized from methyl alcohol to yield 3β-benzoyloxy-5,16,20-pregnatriene.

PREPARATION 5.—3β-VALERYLOXY-5,16-PREGNADIEN-20-ONE

Following the procedure given in Preparation 3, 3β-valeryloxy-5,16-pregnadien-20-one is prepared by reacting valeryl chloride with 16-dehydropregnenolone at room temperature to produce 3β-valeryloxy-5,16-pregnadien-20-one.

PREPARATION 6.—3β-VALERYLOXY-20-ACETOXY-5,16,20-PREGNATRIENE

Following the procedure given in Preparation 4, 3β-valeryloxy-20-acetoxy-5,16,20-pregnatriene is produced by heating 3β-valeryloxy-5,16-pregnadien-20-one with isopropenyl acetate to yield 3β-valeryloxy-20-acetoxy-5,16,20-pregnatriene.

In the manner as shown by Examples 3 through 6, other representative starting compounds can be prepared such as: 3β - phenylacetoxy - 20 - acetoxy - 5,16,20-pregnatriene, 3β - toluyloxy - 20 - acetoxy - 5,16,20-pregnatriene, 3β - anisoyloxy - 20 - acetoxy - 5,16,20-pregnatriene, 3β - salicyloyloxy - 20 - acetoxy - 5,16,20-pregnatriene, 3β - propionyloxy - 20 - acetoxy - 5,16,20-pregnatriene, 3β - butyryloxy - 20 - acetoxy - 5,16,20-pregnatriene, 3β - isovaleryloxy - 20 - acetoxy - 5,16,20-pregnatriene, 3β-hexanoyloxy-20-acetoxy-5,16,20-pregnatriene, 3β-heptanoyloxy-20-acetoxy-5,16,20-pregnatriene, 3β-octanoyloxy-20-acetoxy-5,16,20-pregnatriene, 3β-(β-cyclopentylpropionyloxy) - 20 - acetoxy - 5,16,20 - pregnatriene, 3β - gallyloxy - 20 - acetoxy - 5,16,20 - pregnatriene, 3β - maleyloxy - 20 - acetoxy - 5,16,20 - pregnatriene, 3β - dihydrogencitryloxy - 20 - acetoxy - 5,16,20-pregnatriene, 3β - hemisuccinyloxy - 20 - acetoxy - 5,16,20-pregnatriene, 3β - hemitartaryloxy - 20 - acetoxy-5,16,20-pregnatriene, 3β-acetoxy-20-propionyloxy-5,16,20-pregnatriene, 3β-acetoxy-20-butyryloxy-5,16,20-pregnatriene, 3β-acetoxy-20-valeryloxy-5,16,20-pregnatriene, 3β-acetoxy-20-isovaleryloxy-5,16,20-pregnatriene, 3β-acetoxy-20-hexanoyloxy-5,16,20-pregnatriene, 3β-acetoxy-20-heptanoyloxy - 5,16,20 - pregnatriene, 3β - acetoxy - 20 - octanoyloxy-5,16,20-pregnatriene, 3β-acetoxy - 20 - benzoyloxy-5,16,20 - pregnatriene, 3β - acetoxy - 20 - phenylacetoxy-5,16,20-pregnatriene, 3β - acetoxy - 20 - toluyloxy-5,16,20-pregnatriene, 3β-acetoxy-20-anisoyloxy-5,16,20-pregnatriene, 3β-acetoxy-20-salicyloyloxy-5,16,20-pregnatriene, 3β-acetoxy - 20 - (β - cyclopentylpropionyloxy) - 5,16,20-pregnatriene, 3β-acetoxy-20-gallyloxy-5,16,20-pregnatriene, 3β - acetoxy - 20 - maleyloxy - 5,16,20 - pregnatriene, 3β - acetoxy - 20 - dihydrogencitryloxy - 5,16,20-pregnatriene, 3β - acetoxy - 20 - hemisuccinyloxy - 5,16,20-pregnatriene, 3β - acetoxy - 20 - hemitartaryloxy - 5,16,20-pregnatriene, and the like.

*Example 1.—3β,20-diacetoxy-5α(6α),16α(17α)-diepoxy-20-pregnene*

A solution containing 0.57 gram (4.12 millimole) of perbenzoic acid in fifteen milliliters of benzene was added to 0.50 gram (1.26 millimole) of 3β,20-diacetoxy-5,16,20-pregnatriene. The resulting solution was allowed to stand in the dark for thirty minutes after which period 2.07 molar equivalents of perbenzoic acid had been consumed as determined by titration of an aliquot sample. Titration of a second aliquot sample fifteen minutes later showed no change in peracid concentration. To the reaction mixture was now added ether and cracked ice. The ether phase was separated, washed with cold five percent sodium hydroxide solution and subsequently with water until the wash-water was neutral. The ether solution was then dried over anhydrous sodium sulfate and evaporated at reduced pressure (the ether was distilled below thirty degrees centigrade) to yield a glassy residue. This residue was twice recrystallized to give 3β,20-diacetoxy-5α(6α),16α(17α)-diepoxy-20-pregnene of melting point 162 to 163 degrees centigrade.

*Analysis.*—Calculated for $C_{25}H_{34}O_6$: C, 69.74; H, 7.96. Found: C, 69.72; H, 8.02.

*Example 2.—3β,20-dipropionoxy-5α(6α),16α(17α)-diepoxy-20-pregnene*

In the manner given in Example 1, 3β,20-dipropionoxy-5,16,20-pregnatriene is admixed with a solution of perbenzoic acid in benzene to yield 3β,20-dipropionoxy-5α-(6α),16α(17α)-diepoxy-20-pregnene.

*Example 3.—3β,20-dibutyryloxy-5α(6α),16α(17α)-diepoxy-20-pregnene*

In the manner given in Example 1, 3β,20-dibutyryloxy-5,16,20-pregnatriene is admixed with a solution of perbenzoic acid in benzene to yield 3β,20-dibutyryloxy-5α-(6α),16α(17α)-diepoxy-20-pregnene.

*Example 4.—3β-benzoyloxy-20-acetoxy-5α(6α),16α-(17α)-diepoxy-20-pregnene*

In the manner given in Example 1, 3β-benzoyloxy-20-acetoxy-5,16,20-pregnatriene is admixed with a solution of perbenzoic acid in benzene to yield 3β-benzoyloxy-20-acetoxy-5α(6α),16α(17α)-diepoxy-20-pregnene.

*Example 5.—3β-salicyloyloxy-20-acetoxy-5α(6α),16α-(17α)-diepoxy-20-pregnene*

In the manner given in Example 1, 3β-salicyloyloxy-20-acetoxy-5,16,20-pregnatriene is admixed with a solution of perbenzoic acid in benzene to yield 3β-salicyloyloxy-20-acetoxy-5α(6α),16α(17α)-diepoxy-20-pregnene.

*Example 6.—3β-valeryloxy-20-acetoxy-5α(6α),16α-(17α)-diepoxy-20-pregnene*

In the manner given in Example 1, 3β-valeryloxy-20-acetoxy-5,16,20-pregnatriene is admixed with a solution of perbenzoic acid in benzene to yield 3β-valeryloxy-20-acetoxy-5α(6α),16α(17α)-diepoxy-20-pregnene.

*Example 7.—3β-acetoxy-20-(β-cyclopentylpropionyloxy)-5α(6α),16α(17α)-diepoxy-20-pregnene*

In the manner given in Example 1, 3β-acetoxy-20-(β-cyclopentylpropionyloxy)-5,16,20-pregnatriene is admixed with a solution of perbenzoic acid in benzene to yield 3β-acetoxy-20-(β-cyclopentylpropionyloxy)5α(6α),-16α(17α)-diepoxy-20-pregnene.

*Example 8.—3β,20-diacetoxy-5α(6α),16α(17α)-diepoxy-20-pregnene*

A solution of 3.98 grams of 3β,20-diacetoxy-5,16,20-pregnatriene, dissolved in 95 milliliters of chloroform and cooled to five degrees centigrade was admixed with a slurry made of 0.1234 gram of anhydrous sodium acetate and 5.7 milliliters of forty percent peracetic acid. The resulting solution was stored in a refrigerator at five degrees centigrade, and small aliquot samples were removed at regular time intervals for titration. After six hours two molar equivalents of peracetic acid had been consumed. No further change was noted after eighteen additional hours, hence the colorless solution was diluted with chloroform, washed with water, five percent sodium hydroxide solution and then with water until the wash-waters were neutral. The chloroform solution was then dried over anhydrous sodium sulfate and evaporated to dryness yielding 3.73 grams of fine needles of 3β,20-diacetoxy - 5α(6α), 16α(17α) - diepoxy - 20 - pregnene. After two recrystallizations from methanol the melting point of 3β,20-diacetoxy-5α(6α),16α(17α)-diepoxy-20-pregnene was found to be 166 to 167 degrees centigrade, $[α]_D$-25 degrees in chloroform.

*Analysis.*—Calculated for $C_{25}H_{34}O_6$: C, 69.74; H, 7.96. Found: C, 69.79; H, 8.03.

In a manner similar to Examples 1 through 8 by treating a selected 3β,20-diacyloxy-5,16,20-pregnatriene with a peracid such as performic, peracetic, perbenzoic, monoperphthalic acid, and the like, other representative 3β,20-diacyloxy - 5α(6α),16α(17α) - diepoxy - 20 - pregnenes are prepared such as: 3β,20-divaleryloxy-5α(6α),16α(17α)-diepoxy - 20 - pregnene, 3β,20 - dihexanoyloxy - 5α(6α) - 16α(17α) - diepoxy - 20 - pregnene, 3β,20 - diheptanoyloxy - 5α(6α),16α(17α) - diepoxy - 20 - pregnene, 3β,20-dioctanoyloxy - 5α(6α),16α(17α) - diepoxy - 20 - pregnene, 3β,20 - di - (β-cyclopentylpropionyloxy) - 5α-(6α),16α(17α)-diepoxy - 20 - pregnene, 3β,20 - dibenzoyloxy - 5α(6α),16α(17α) - diepoxy - 20 - pregnene, 3β,20 - dianisoyloxy - 5α(6α),16α(17α) - diepoxy - 20-pregnene, 3β,20 - disalicyloyloxy - 5α(6α),16α(17α)-diepoxy - 20 - pregnene, 3β,20 - diphenylacetoxy - 5α-(6α),16α(17α) - diepoxy - 20 - pregnene, 3β - acetoxy-20 - propionyloxy - 5α(6α),16α(17α) - diepoxy - 20-pregnene, 3β - acetoxy - 20 - butyryloxy - 5α(6α),16α-(17α) - diepoxy - 20 - pregnene, 3β - acetoxy - 20-valeryloxy - 5α(6α),16α(17α) - diepoxy - 20 - pregnene, 3β - acetoxy - 20 - isovaleryloxy - 5α(6α),16α(17α)-diepoxy - 20 - pregnene, 3β - acetoxy - 20 - hexanoyloxy-5α(6α),16α(17α) - diepoxy - 20 - pregnene, 3β - acetoxy-20 - heptanoyloxy - 5α(6α),16α(17α) - diepoxy - 20-pregnene, 3β - acetoxy - 20 - octanoyloxy - 5α(6α),-16α(17α) - diepoxy - 20 - pregnene, 3β - acetoxy - 20-benzoyloxy - 5α(6α),16α(17α) - diepoxy - 20 - pregnene, 3β - acetoxy - 20 - phenylacetoxy - 5α(6α),16α(17α)-diepoxy - 20 - pregnene, 3β - acetoxy - 20 - toluyloxy-5α(6α),16α(17α) - diepoxy - 20 - pregnene, 3β - acetoxy-20 - anisoyloxy - 5α(6α),16α(17α) - diepoxy - 20 - pregnene, 3β - acetoxy - 20 - salicyloyloxy - 5α(6α),16α-(17α) - diepoxy - 20 - pregnene, 3β - acetoxy - 20-gallyloxy - 5α(6α),16α(17α) - diepoxy - 20 - pregnene, 3β - acetoxy - 20 - maleyloxy - 5α(6α),16α(17α) - diepoxy - 20 - pregnene, 3β - acetoxy - 20 - dihydrogencitryloxy - 5α(6α),16α(17α) - diepoxy - 20 - pregnene, 3β - acetoxy - 20 - hemisuccinyloxy - 5α(6α),16α(17α)-diepoxy - 20 - pregnene, 3β - acetoxy - 20 - hemitartaryloxy - 5α(6α),16α(17α) - diepoxy - 20 - pregnene, 3β-phenylacetoxy - 20 - acetoxy - 5α(6α),16α(17α) - diepoxy - 20 - pregnene, 3β - toluyloxy - 20 - acetoxy - 5α(6α),16α(17α) - diepoxy - 20 - pregnene, 3β-anisoyloxy - 20 - acetoxy - 5α(6α),16α(17α) - diepoxy-20 - pregnene, 3β - propionyloxy - 20 - acetoxy - 5α-(6α),16α(17α) - diepoxy - 20 - pregnene, 3β - butyryloxy - 20 - acetoxy - 5α(6α),16α(17α) - diepoxy - 20-pregnene, 3β - isovaleryloxy - 20 - acetoxy - 5α(6α),16α-(17α) - diepoxy - 20 - pregnene, 3β - hexanoyloxy - 20-acetoxy - 5α(6α),16α(17α) - diepoxy - 20 - pregnene, 3β - heptanoyloxy - 20 - acetoxy - 5α(6α),16α(17α) - diepoxy - 20 - pregnene, 3β - octanoyloxy - 20 - acetoxy-5α(6α),16α(17α) - diepoxy - 20 - pregnene, 3β - (β-cyclopentylpropionyloxy) - 20 - acetoxy - 5α(6α),16α-(17α) - diepoxy - 20 - pregnene, 3β - gallyloxy - 20-acetoxy - 5α(6α),16α(17α) - diepoxy - 20 - pregnene, 3β - maleyloxy - 20 - acetoxy - 5α(6α),16α(17α) - diepoxy - 20 - pregnene, 3β - dihydrogencitryloxy - 20-acetoxy - 5α(6α),16α(17α) - diepoxy - 20 - pregnene, 3β - hemisuccinyloxy - 20 - acetoxy - 5α(6α),16α(17α)-diepoxy - 20 - pregnene, 3β - hemitartaryloxy - 20- acetoxy - 5α(6α),16α(17α) - diepoxy - 20 - pregnene, and the like.

It is to be understood that this invention is not to be limited to the exact details of operation or exact compounds shown and described as obvious modifications and equivalents will be apparent to one skilled in the art and the invention is therefore to be limited only by the scope of the appended claims.

I claim:

1. A 3β,20-diacyloxy-5α(6α),16α(17α) - diepoxy-20-pregnene of the formula:

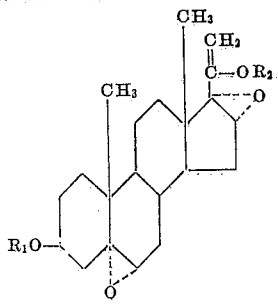

wherein $R_1$ and $R_2$ are the acyl radicals of hydrocarbon carboxylic acids containing up to and including eight carbon atoms.

2. 3β,20-diacetoxy-5α(6α),16α(17α)-diepoxy-20-pregnene.

3. 3β,20-dipropionyloxy-5α(6α),16α(17α)-diepoxy-20-pregnene.

4. 3β - benzoyloxy - 20 - acetoxy - 5α(6α),16α(17α)-diepoxy-20-pregnene.

5. 3β-acetoxy-20-(β-cyclopentylpropionyloxy)-5α(6α),-16α(17α)-diepoxy-20-pregnene.

6. A process for the production of a 3β,20-diacyloxy-5α(6α),16α(17α)-diepoxy-20-pregnene which comprises mixing a 3β,20-diacyloxy-5,16,20-pregnatriene of the formula:

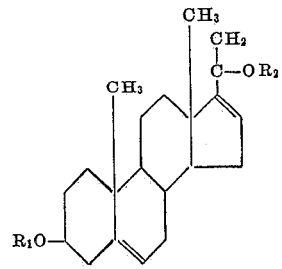

wherein $R_1$ and $R_2$ are the acyl radicals of hydrocarbon carboxylic acids containing up to and including eight carbon atoms, with an organic peracid at a temperature between minus ten and plus forty degrees centigrade to give a 3β,20-diacyloxy-5α(6α),16α(17α)-diepoxy-20-pregnene.

7. A process for the production of 3β,20-diacetoxy-5α(6α),16α(17α)-diepoxy-20-pregnene which comprises mixing 3β,20-diacetoxy-5,16,20-pregnatriene with an organic peracid selected from the group consisting of performic, peracetic, perbenzoic and monoperphthalic acid at a temperature between zero and thirty degrees centigrade to give 3β,20-diacetoxy-5α(6α),16α(17α)-diepoxy-20-pregnene.

References Cited in the file of this patent

UNITED STATES PATENTS

| | | |
|---|---|---|
| 2,312,344 | Logemann | Mar. 2, 1943 |
| 2,323,277 | Miescher | June 29, 1943 |
| 2,602,769 | Murray | July 8, 1952 |
| 2,686,181 | Julian | Aug. 10, 1954 |

OTHER REFERENCES

Moffet: JACS, 74, pp. 2183–85 (1952).